(12) United States Patent
Stone et al.

(10) Patent No.: US 6,362,907 B1
(45) Date of Patent: Mar. 26, 2002

(54) APPARATUS AND METHOD FOR TRANSMITTING DATA BETWEEN VLSI CHIPS

(75) Inventors: Harold S. Stone, Princeton; Thomas Wren Ebbesen, Plainsboro, both of NJ (US)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/259,104

(22) Filed: Feb. 26, 1999

(51) Int. Cl.[7] .......................... H04B 10/00; H04B 10/12
(52) U.S. Cl. .......................... 359/154; 385/14; 359/160
(58) Field of Search .................................. 359/163, 154, 359/161, 160, 152, 193, 188, 180; 385/14; 250/551, 226, 214 R

(56) References Cited

U.S. PATENT DOCUMENTS

| | | | | |
|---|---|---|---|---|
| 4,393,515 A | * | 7/1983 | de Nuemann | 455/606 |
| 4,682,323 A | * | 7/1987 | Corfield | 370/4 |
| 4,939,793 A | * | 7/1990 | Stewart | 455/605 |
| 5,143,854 A | | 9/1992 | Pirrung et al. | |
| 5,357,363 A | | 10/1994 | Li et al. | |
| 5,424,186 A | | 6/1995 | Fodor et al. | |
| 5,625,636 A | * | 4/1997 | Bryan | 372/50 |
| 5,933,608 A | * | 8/1999 | Osmon | 395/200.73 |

OTHER PUBLICATIONS

Thomas W. Ebbesen, et al., "Energy Transfer From Sodium N–Alkyl Carbazole Sulfonate To Zinc Tetraphenylporphyrin In Micellar Solutions", Photochem. Photobiol. vol. 35, pp. 665–669, 1982.

M. Rougee, et al., Kinetics and Mechanism Of Porphyrin-Photosensitized Reduction of Methylviologen, Journal of Physical Chemistry, 1982, 86, 4404.

* cited by examiner

Primary Examiner—Jason Chan
Assistant Examiner—Agustin Bello
(74) Attorney, Agent, or Firm—Scully, Scott, Murphy & Presser

(57) ABSTRACT

A transmitter for transmitting data in the form of an optical signal. The transmitter having: a transmitter chip module having a material capable of radiating light of a first wavelength when both a zero voltage potential exists across the material and when illuminated by light of a second wavelength; a light source optically coupled to the transmitter chip module for illuminating the material with light of the second wavelength; and a voltage controller for controlling the voltage potential across the first material. Also provided is a receiver for receiving data in the form of an optical signal having a first wavelength. The receiver having: a receiver chip module having a material capable of producing a signal in the form of a produced voltage potential or produced current when illuminated by light of both the first wavelength and light of a second wavelength; a light source optically coupled to the receiver chip module for illuminating the material with light of the second wavelength; and a signal detector for detecting presence of the produced signal.

28 Claims, 7 Drawing Sheets

US 6,362,907 B1

APPARATUS AND METHOD FOR TRANSMITTING DATA BETWEEN VLSI CHIPS

BACKGROUND OF THE INVENTION

1. Field of the Invention

The present invention relates generally to VLSI chips and, more particularly, to an optical method for communicating between a transmitter VLSI chip and a receiver VLSI chip such that the noise characteristic of communication between chips is limited.

2. Description of the Related Art

The bandwidth for the transmission of data between very large scale integrated (VLSI) chips in modern computers is limited by noise. Much of this noise is produced by rapid changes of electrical current, and is called switching noise or Δ-I noise. Because data transmission between devices requires substantial electrical power, interdevice data transmission produces a substantial fraction of observed switching noise, and thereby contributes to the bandwidth limitation on data rate.

SUMMARY OF THE INVENTION

Therefore it is an object of the present invention to provide an apparatus and method for transmitting data between VLSI chips which reduces the noise characteristic with communications between VLSI chips.

It is yet a further object of the present invention to provide an apparatus and method for transmitting data between VLSI chips which increases data transfer rates over methods currently employed in the arts.

It is the purpose of this invention to power both the transmission and the reception of data in a manner that contributes minimally to switching noise. The power for both transmission and reception of data is supplied from an external laser in a way that greatly reduces current transients within a VLSI device. Consequently, data rates are potentially faster with this means than with electrical means.

Accordingly, a transmitter for transmitting data in the form of an optical signal and a receiver for receiving data in the form of an optical signal are provided. The transmitter comprises: a transmitter chip module having a material capable of radiating light of a first wavelength when both a zero voltage potential exists across the material and when illuminated by light of a second wavelength; a light source optically coupled to the transmitter chip module for illuminating the material with light of the second wavelength; and voltage control means for controlling the voltage potential across the first material. The receiver comprises: a receiver chip module having a material capable of producing a signal in the form of a produced voltage potential or produced current flow when illuminated by light of both the first wavelength and light of a second wavelength; a light source optically coupled to the receiver chip module for illuminating the material with light of the second wavelength; and signal detecting means for detecting the presence of the produced signal.

In a first preferred implementation of the transmitter and receiver of the present invention, a first apparatus for transmitting data between first and second VLSI chips is provided. The first apparatus comprises: a transmitter disposed on the first VLSI chip, the transmitter having a first material capable of radiating light of a first wavelength when both a zero voltage potential exists across the first material and when illuminated by light of a second wavelength, the transmitter further having voltage control means for controlling the voltage potential across the first material; a receiver disposed on the second VLSI chip, the receiver having a second material capable of producing a signal in the form of a produced voltage potential or produced current flow when illuminated by light of both the first wavelength and a third wavelength, the receiver further having signal detecting means for detecting the presence of the produced signal; at least one light source optically coupled to the transmitter and receiver for illuminating the first material with light of the second wavelength and for illuminating the second material with light of the third wavelength; and light transmission means for transmitting the light of the first wavelength from the transmitter to the receiver.

In a second preferred implementation of the transmitter and receiver of the present invention, a second apparatus for transmitting data between first and second VLSI chips is provided. The second apparatus comprises: a plurality of transmitters disposed on the first VLSI chip, each transmitter having a first material capable of radiating light of a first wavelength when both a zero voltage potential exists across the first material and when illuminated by light of a second wavelength; a plurality of receivers disposed on the second VLSI chip, each receiver corresponding to a transmitter on the first VLSI chip, each receiver having a second material capable of producing a signal in the form of a produced voltage potential or produced current flow when illuminated by light of both the first wavelength and a third wavelength; voltage control means for individually controlling the voltage potential across the first material of each transmitter; signal detecting means for individually detecting the presence of the produced signal from each receiver; at least one light source optically coupled to each of the transmitters and receivers for illuminating the first material of each of the transmitters with light of the second wavelength and for illuminating the second material of each of the receivers with light of the third wavelength; and light transmission means for transmitting the light of the first wavelength from each of the transmitters to a corresponding receiver.

In a preferred versions of the first and second apparatus of the present invention, first and second light sources are provided. The first light source providing light of the second wavelength, the second light source providing the light of the third wavelength.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1A:
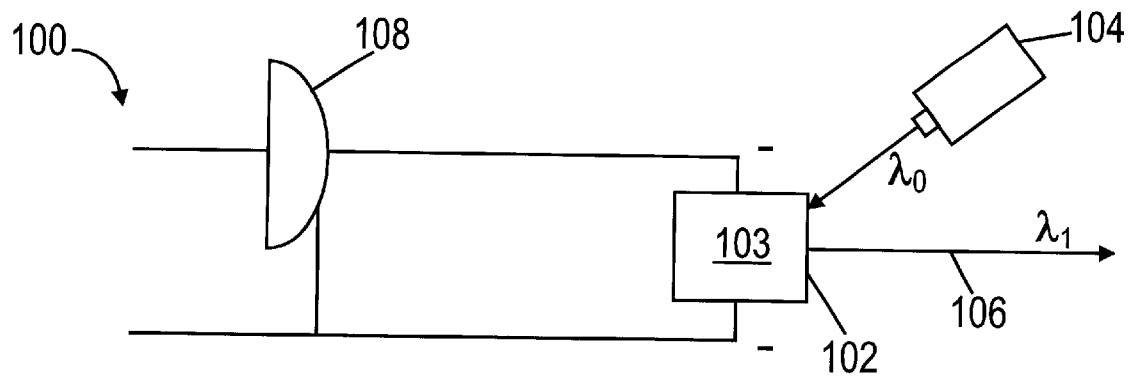
FIG. 1a illustrates a portion of a transmitter VLSI chip of the present invention in an activated state.

Before discussing the preferred implementation of the present invention in detail, a general overview of the physical principles behind the present invention will be discussed with reference to FIGS. 1a, 1b, 2a, and 2b.

The present invention transmits data in optical form between two digital devices contained on VLSI chips, a transmitter 100, and a receiver 200. The transmitter 100 has a first material 102 of organic molecules that are deactivated by a voltage potential across them. When a first light source, such as a first external laser 104 at a pump wavelength of $\lambda_0$ illuminates the first material 102, the first material 102 radiates an optical signal 106 at wavelength of $\lambda_1$. The radiated optical signal 106 passes through a light path (e.g., optical fibers) that guides it to a receiver chip 200. At the receiver chip 200, the optical signal 106 illuminates a second material 202 of organic molecules that are sensitive to wavelength $\lambda_1$, and forces the organic molecules of the second material 202 into an excited state.

Subsequently, a second light source, such as a second external laser 206 illuminates the second material 202 at wavelength $\lambda_2$. The second material 202, if in the excited state, reacts by producing a signal in the form of a produced voltage potential or current flow that can be sensed digitally without further amplification by a signal detector 212, preferably a voltage detector. If the second material 202 is not in the excited state, no voltage or current is produced when the second external laser 206 illuminates it. It can be appreciated that the power required to convert data from electrical to optical form is supplied by the first external transmitter laser 104, and the power required to amplify the received signal 106 to a useful voltage level is supplied by the second external receiver laser 206. Thus, since both the first and second lasers 104, 206 are isolated from the power supply that drives the transmitter 100 and receiver 200, switching noise produced by changes in the optical signal 106 is greatly reduced, thereby enabling faster operation of the digital logic.

The overview provided discusses first and second external lasers 104, 206, one each for the transmitter 100 and the receiver 200. However, it should be appreciated by someone of ordinary skill in the art that a single laser can be utilized for illuminating both the first and second materials 102, 202 of the transmitter 100 and receiver 200 without departing from the scope or spirit of the present invention. For instance, a single high bandwidth light source can replace the first and second lasers 104, 206, wherein light of the first and second wavelengths are filtered from the high bandwidth light source and directed at the respective first and second materials 102, 202.

Figure 1B:
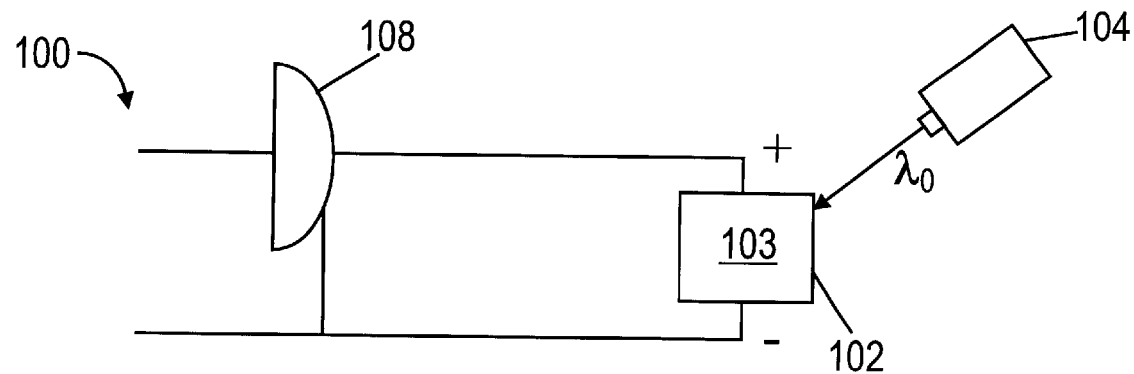
FIG. 1b illustrates a portion of a transmitter VLSI chip of the present invention in an non-activated state.

In FIG. 1a, logic device 108 drives a transmitter chip module 103, which is made of or coated with the first material 102. The first material 102 reacts to the absence of voltage by being sensitive to external light. In this state, it is said to be "activated". When the transmitter chip module 103 is in the activated state, and is illuminated by light at wavelength $\lambda_0$ it changes state to a "photo-emitting" state and spontaneously emits light at wavelength $\lambda_1$ (signal 106). In FIG. 1b, logic device 108 deposits positive charge on the transmitter chip module 103. The first material 102 reacts to the voltage potential across it by producing, for instance, radicals. In this state, the first material 102 does not photo-emit when illuminated by light at wavelength $\lambda_0$, and is said to be in the "deactivated" state. In both FIGS. 1a and 1b, the first external laser 104 illuminates the first material 102 of the transmitter chip module 103 with light of wavelength $\lambda_0$. The activated transmitter chip module 103 in FIG. 1a responds by emitting light at wavelength $\lambda_1$ (signal 106) in response to the absorption of the light at wavelength $\lambda_0$.

Note that the amplification of the signal 106 for transmission to the receiver 200 is done within the molecular structure of the first material 102 of the transmitter chip module 103. The first external laser 104 provides the majority of the energy required to produce the transmitted signal 106. Fluctuations in the internal state of the transmitter chip module 103 do not lead to large changes in current flow through the logic devices. Consequently, power fluctuations related to transmission of the signal 106 are isolated from the power supply of the logic device 108, and thus they do not introduce noise into the transmission of a digital logic signal.

Figure 2A:
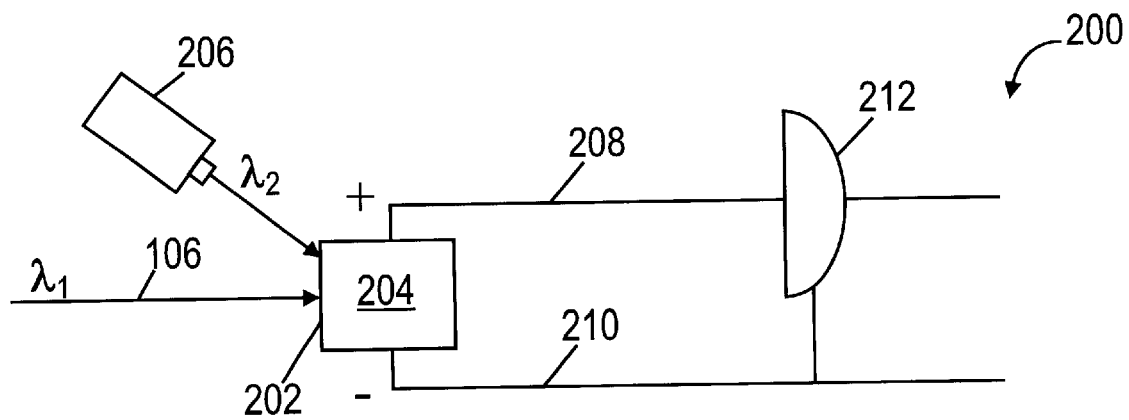
FIG. 2a illustrates a portion of a receiver VLSI chip of the present invention in an excited state.
Figure 2B:
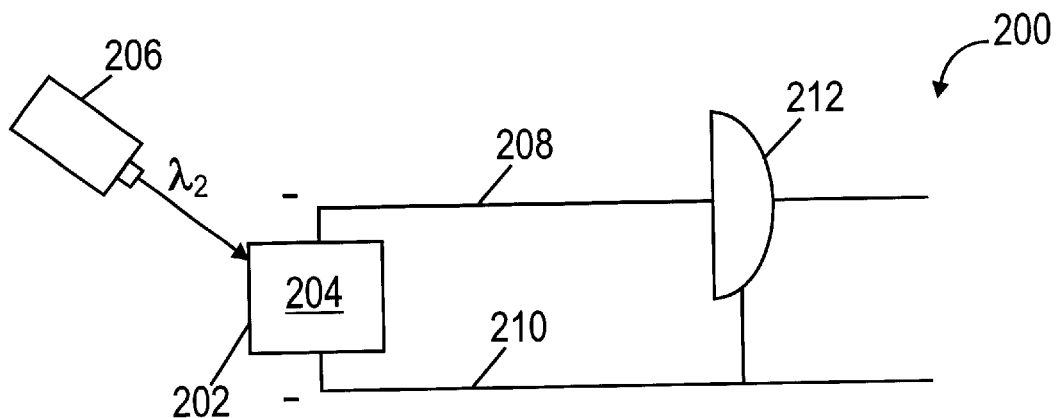
FIG. 2b illustrates a portion of a receiver VLSI chip of the present invention in an non-excited state.

FIGS. 2a and 2b show a schematic diagram of what happens when the signal light 106 reaches a receiver chip module 204 and is converted to an electrical signal. Receiver chip module 204 in FIGS. 2a and 2b has a second material 202 having photosensitive molecules deposited on receiving pads located on the chip module. The receiver 200 operates as follows. First, the received light signal 106 from a transmitter chip module 103 illuminates a corresponding receiver chip module 204 (referred to as a transmitter/receiver chip module pair). In FIG. 2a, the second material 202 of the receiver chip module 204 receives the signal 106 at wavelength $\lambda_1$, whereas the second material 202 of the receiver chip module 204 in FIG. 2b receives no signal 106. The receiver chip module 204 responds to the signal light 106 by shifting its absorption band to a higher wavelength. Such a receiving site is in the "excited" state. When the second material 202 of the receiver chip module 204 receives signal energy at wavelength $\lambda_1$ (signal 106), the second material 202 on the chip module 204 changes its state to the excited state. No change of state occurs in the second material 202 on the chip module 204 in FIG. 2b, because no signal energy 106 is received in this case. Next, the second external laser 206 with light of wavelength $\lambda_2$ illuminates the receiver chip module 204. The second material 202 of the receiver chip module 204, when in the excited state, responds to the presence of light of wavelength $\lambda_2$ by changing its external potential or by emitting a current flow. Thus, the receiver chip module 204 in FIG. 2a produces a high external voltage or a high current flow at its terminals 208, 210. However, the receiver chip module 204 in FIG. 2b does not respond. The response from the receiver chip module 204 of FIG. 2a is treated as a logic value of 1 and the lack or response of the receiver chip module 204 of FIG. 2b is treated as a logic value of 0. The amplification power comes from the second external laser 206 emitting at wavelength $\lambda_2$, and thus this power is isolated from the power supply of the receiver 100. This prevents noise currents due to rapid changes of state from reaching electronic receivers.

Although the present invention has thus far been discussed with a single transmitter chip module 103 and a corresponding receiver chip module 204 for simplicity, it should be apparent to one of ordinary skill in the art that a plurality of transmitter chip modules 103 and corresponding receiver chip modules 204 can be provided, each transmitter and corresponding receiver chip module 103, 204 being a transmitter/receiver chip module pair. The voltage potential across each transmitter chip module 103, is controlled via a central processor to place them in either the activated or deactivated states. The transmitter chip modules 103 are then illuminated with light of their respective wavelengths to transmit and receive a signal 106 only for those transmitter chip modules 103 that are in the activated states. In this arrangement, more than one bit of data can be transmitted at a time, for instance, eight transmitter chip modules 103 each having a corresponding receiver chip module 204 can transmit eight bits of data at a time. Any transmitter chip module 103 which is activated and receiver chip module 204 which is energized in a transmitter/receiver chip module pair (the transmitter 100 produces an optical signal 106 and the receiver 200 produces an electrical signal) corresponds to a logical value of 1, and any transmitter chip module 103 which is not activated and receiver chip module 204 which is not energized in a transmitter/receiver chip module pair (the transmitter 100 does not produce an optical signal 106 and the receiver 200 does not produce an electrical signal) corresponds to a logical value of 0. In this way, a data string of eight values is transmitted. This could be done with a multiplicity of lasers, one laser per transmitter chip module 103, one laser per receiver chip module 204 or with a single light source for each of the transmitter and receiver chip modules that illuminates all the transmitter and receiver chip modules 103, 204 concurrently or sequentially.

Figure 3:
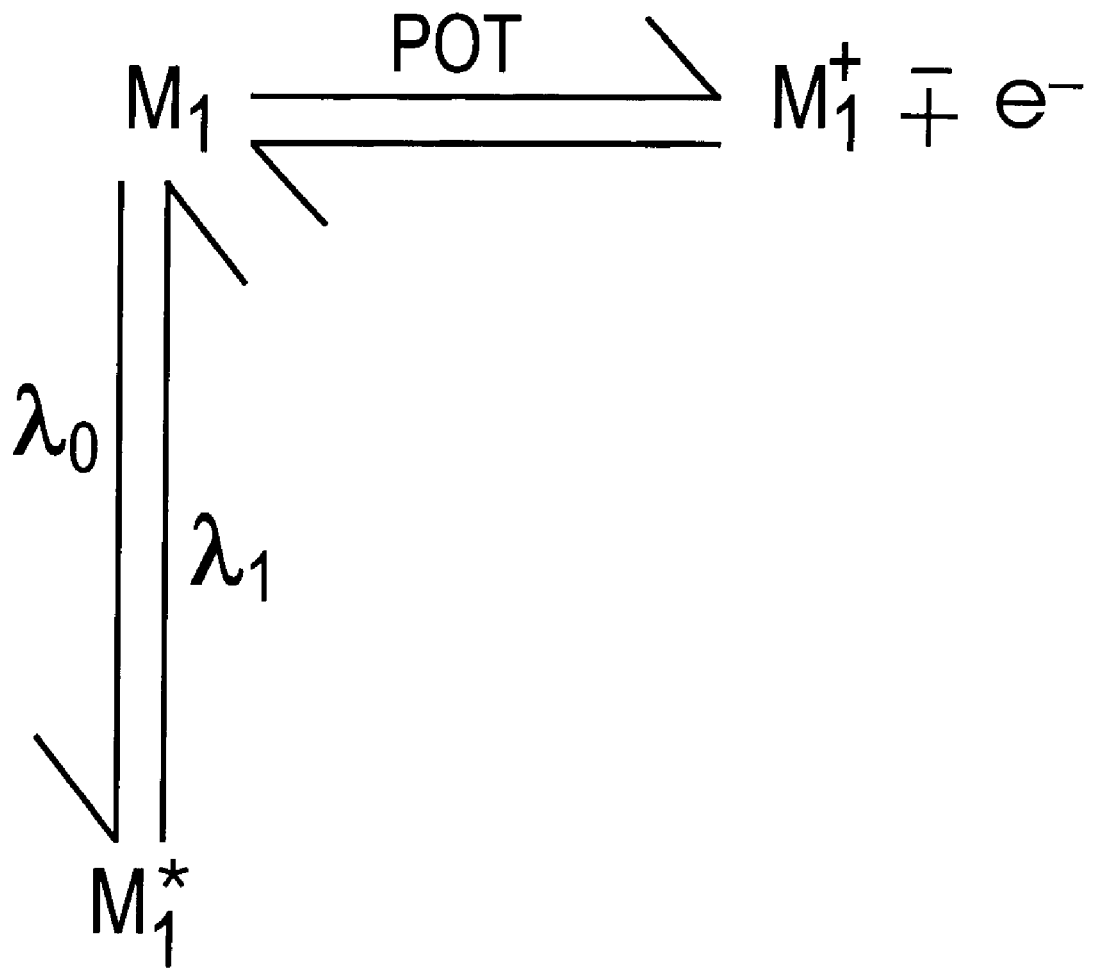
FIG. 3 illustrates a symbolic description of the transmitter interactions of a transmitter VLSI chip of the present invention.

FIG. 3 is a diagram of the state transitions within the molecular material of the first material 102 used in the transmitter chip module 103. In a preferred embodiment, the first material 102 is a carbozole, and is denoted as $M_1$. The activated state is indicated by $M_1^*$. The deactivated state is $M_1^+$, a state in which the material gives off or captures electrons. In the activated state, light at wavelength $\lambda_0$ causes a transition to the state $M_1^*$, which is followed by a spontaneous transition back to state $M_1$ within nanoseconds and is accompanied by light emission at wavelength $\lambda_1$.

Figure 4A:
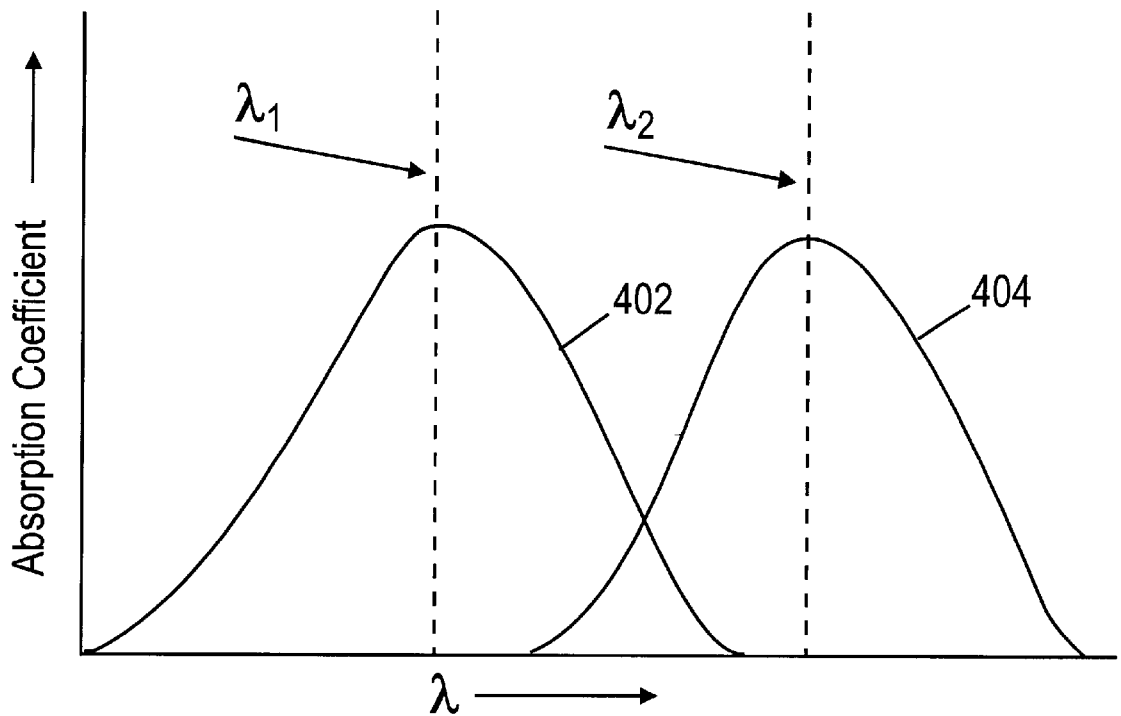
FIGS. 4a and 4b illustrate the receiver interactions of a receiver VLSI chip of the present invention, with FIG. 4a illustrating a graphical comparison of the receiver molecules absorption in the ground state and the shifted absorption band of the excited state and FIG. 4b illustrating the phase transitions that the receiver molecules undergo as they receive light of the frequencies which produce a voltage potential.
Figure 4B:
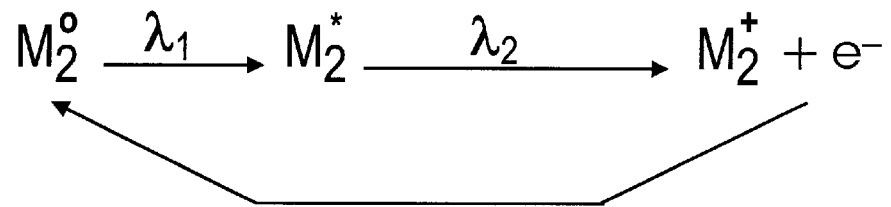

FIGS. 4a and 4b are symbolic illustrations of the state transitions within the molecular material of the second material 202 used in the receiver chip module 204. In a preferred embodiment, the second material 202 is a porphyrin $M_2$. Initially, the second material 202 is in a ground state denoted as $M_2^0$. When the second material 202 receives light at wavelength $\lambda_1$ (signal 106) while in the ground state, it changes state to a state called the excited state, denoted as $M_2^*$. The second material 202 has the property that the light-absorption properties of the two states are different, and that the absorption band for state $M_2^*$ is shifted in frequency with respect to the absorption band for state $M_2^0$. FIG. 4a shows the absorption band of the second material 202 in the ground state on the left (402), and the shifted absorption band of the excited state on the right (404). The center frequency of the ground state band (402) is $\lambda_1$, and the center frequency of the excited state (404) is $\lambda_2$. FIG. 4b shows the phases that the receiver undergoes as it receives light successively at frequencies $\lambda_1$ and $\lambda_2$. When the second material 202 is in ground state $M_2^0$ and receives light at wavelength $\lambda_1$ (signal 106), it absorbs the light and moves to state $M_2^*$. If the second material 202 receives light at wavelength $\lambda_2$ in state $M_2^*$, the second material 202 responds by changing state to a state called the ionized state $M_2^+$. In this state, the second material 202 spontaneously emits electrons and produces an electrical current or increases the voltage potential across its terminals 208, 210. If the second material 202 receives light at wavelength $\lambda_2$ while in ground state $M_2^0$, no absorption (or very little absorption occurs), resulting in virtually no current or voltage change across the terminals 208, 210. It is well known in the art that bifunctional molecules can have this behavior.

There are many molecules known in the art; such as anthracenes, pyrenes, perylenes, porphyrins, phthalocyanines, rhodamine dyes, and carbazoles that can be used as the first and second materials 102, 202. In the preferred embodiment, the first material 102 would have as high a photoemission quantum yield as possible (~1) and the second material 202 would have as high an absorption cross-section as possible as the emission wavelengths of the first material 102.

In the preferred implementation, the first material 102 is a carbazole derivative and the second material 202 is a porphyrin derivative. The first material 102, a carbazole derivative, has an emission quantum efficiency of about 0.4 and an emission spectrum that overlaps the spectrum of the strongest absorption band of the second material 202, the porphyrin derivative. As a result, upon activating the first material 102, the carbazole derivative, with $\lambda_0$ (ca. 330 nm), the second material 202, the porphyrin derivative, is excited to $M_2^*$ indirectly via $\lambda_1$ (ca. 390 nm) emitted by the first material 102, the carbazole derivative. $M_2^*$ can be either a singlet or triplet excited state. If it is a single excited state, it may convert rapidly to a triplet excited state. In the case of the preferred embodiment where the second material 202 is a porphyrin derivative, a triplet $M_2^*$ state is formed. It has a strong absorption peak at $\lambda_2$ (ca. 470 nm). When $M_2^1$ is further excited by $\lambda_2$, it photo-ionizes to give the cation radical $M_2^+$. This process may be mono-photonic or bi-photonic (i.e. involving either one or two photons.)

For the transmitter 100, it is not important whether the transmitter 100 is illuminated before or after the voltage potential is applied across the first material 102. Likewise, for the receiver 200, it is not important in which order the illumination occurs. For some second materials, it may be necessary to illuminate the second material 202 with the second external laser 206 when the second material 202 is in a ground state. The optical signal 106 then trips a transmitter 100 in the active state to emit light or a receiver 200 in the excited state to produce a logic-level voltage at its terminals 208, 210. For some second materials 202 it may be necessary for the electronic or optical signal 106 to reach the second material 202 in the ground state, and for light from the second external laser 206 to operate on the second material 202 only after the second material 202 is active or excited.

Figure 5:
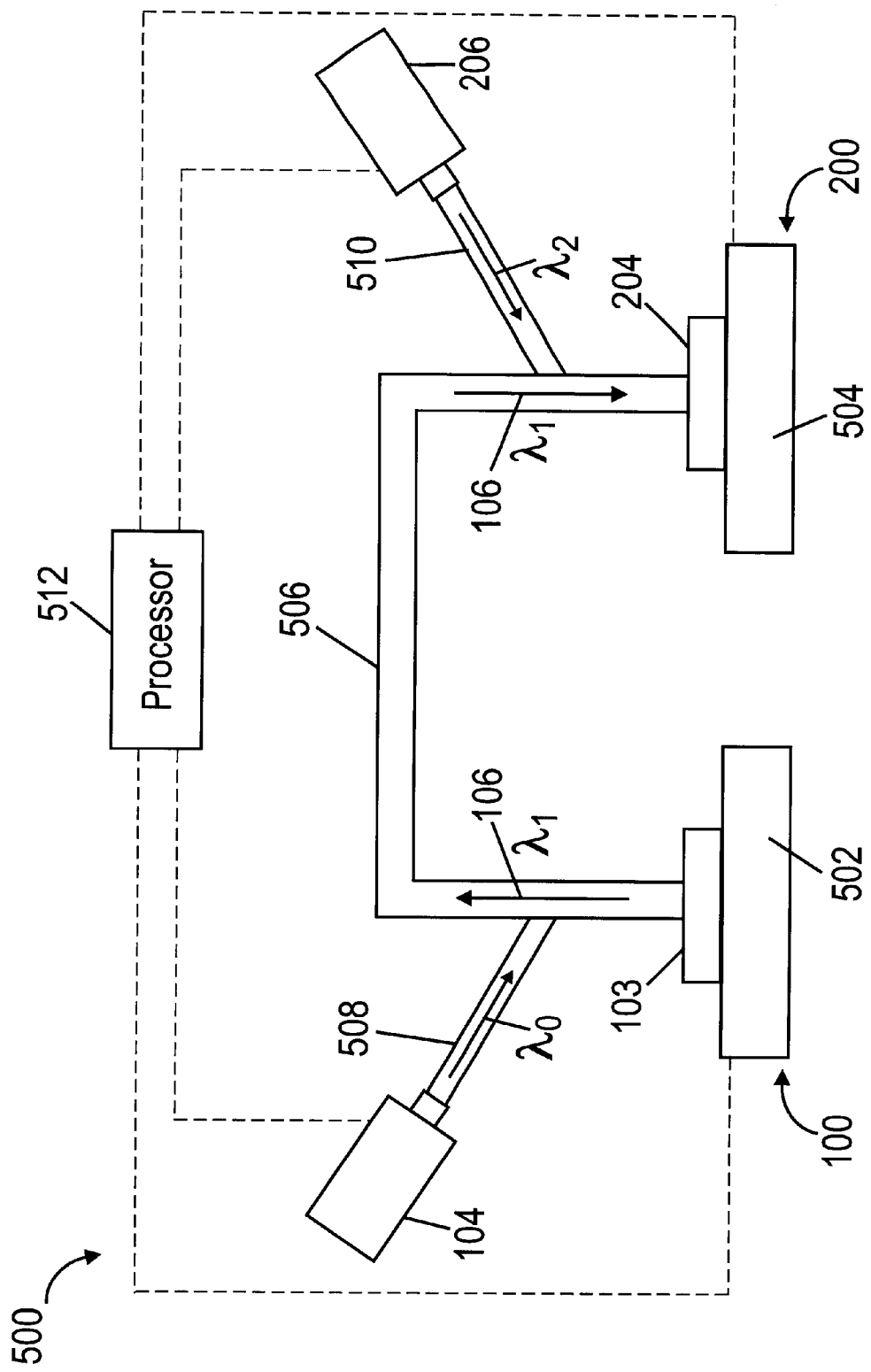
FIG. 5 illustrates a preferred implementation of an embodiment of the apparatus of the present invention for communicating between VLSI chips.

The preferred implementation of the present invention requires each transmitter chip module 103 and each receiver chip module 204 to be in two different light paths. FIG. 5 shows a preferred embodiment of this arrangement, generally referred to by reference numeral 500, illustrating the side views of two logic device substrates, a transmitter substrate 502 and a receiver substrate 504. On each of the substrates is a chip module, a transmitter chip module 103 on the transmitter substrate 502, and a receiver chip module 204 on the receiver substrate 504. The signal light 106 from the transmitter 100 to the receiver 200 is transmitted via a light transmission means, such as by traversing a fused fiber bundle array 506 (optical signal path) or similar device for imaging the output of the transmitter chip module 103 (or array thereof) onto a corresponding receiver chip module 204 (or array thereof). The first external laser 104 for the transmitter chip module 103 (or array thereof) is coupled into the fused fiber array 506 in a manner that illuminates the transmitter chip module 103 (or all of the individual transmitter chip modules of an array), preferably by an optical fiber bunch 508 branched into the fused fiber array 506. Likewise, the second external laser 206 for the receiver chip module 204 (or array thereof) is coupled into the fused fiber array 506 in a manner that illuminates the receiver chip module 204 (or all of the individual receiver chip modules of an array), preferably by an optical fiber bunch 510 branched into the fused fiber array 506. A processor 512, preferably the CPU of the computer which houses the VLSI chips, synchronizes the operation of the first and second external lasers 104, 206, as well as the logic device 108 and voltage detectors 212.

Alternatively, it is also possible to illuminate the transmitter and receiver chip modules 103, 204 from underneath their respective substrates 502, 504 because silicon substrates are virtually transparent to light. However, even if illuminated from below the substrates 502, 504, the signal 106 path continues to lie above the substrate.

Other variations of the optical geometry are possible. Instead of placing each transmitter chip module 103 on a separate area of the substrate 502, the transmitter chip modules 103 can be stacked in a single position. Each first material 102 can be synthesized to emit a different wavelength. The light at different wavelengths can be carried along a common light path to the receiver 200. At the receiver 200, the receiver chip modules 204 can also be realized as a stack, each second. material 202 being sensitive to a different wavelength.

Figure 6:
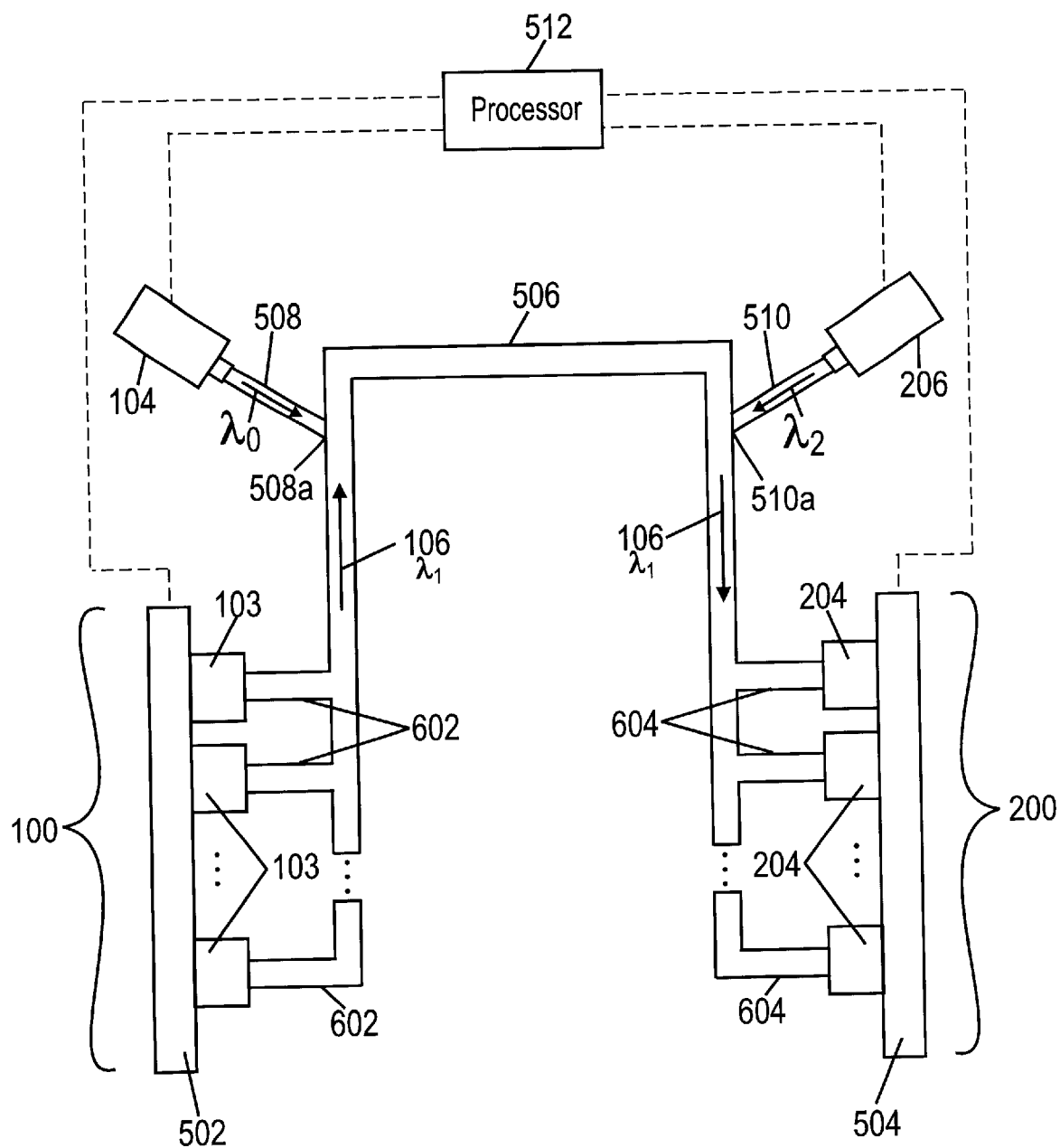
FIG. 6 illustrates a version of the embodiment of FIG. 5 wherein multiple transmitter chip modules transmit data to corresponding receiver chip modules.

In a computer system, there are often several hundred signal paths that carry data from one chip module to another. FIG. 6 shows a system implementation that carries data on multiple paths 602 under the control of a single first external laser 104 at wavelength $\lambda_0$ and a single second external laser 206 at wavelength $\lambda_2$ The signal light 106 path is shown as a bundle or ribbon of fibers 506 that carries signal light from multiple transmitter chip modules 103 to corresponding receiver chip modules 204 via multiple paths 604. Signal light 106 of wavelength $\lambda_1$ is coupled into the light paths at junction 508a and light of wavelength $\lambda_2$ is coupled into the signal light 106 path at junction 510a. In this embodiment, the first and second external lasers 104, 206 can be turned on and off by external control signals controlled by a central processor 512 which also synchronizes the operation of the logic devices 108 and voltage detectors 212. In other embodiments, the light from the first and second external lasers 104, 206 can be gated onto the signal light 106 path through external modulators (not shown).

The substrates that hold the transmitter and receiver chip modules 103, 204 are substrates 502, 504, respectively. A single communication works as follows. The logic on the transmitter substrate 502 places each transmitter chip module 103 in either an activated or deactivated state. The first external laser 104 turns on. Its light of wavelength $\lambda_0$ passes through fiber bunch 508 and junction 508a and into the fused fiber bundle 506 and illuminates the transmitter chip modules 103. The activated transmitter chip modules 103 (any in which the logic has placed a voltage potential across its first material 102) emit the signal light 106 of wavelength $\lambda_1$, which is carried over the fiber bundle 506 to selectively illuminate corresponding receiver chip modules 204. In the preferred embodiment, each transmitter chip module 103 illuminates one and only one receiver chip module 204. In other embodiments, light routing and switching can be employed to route light to multiple receivers, and allow the destinations to vary in time.

The receiver chip molecules 204 illuminated by the signal light 106 of wavelength $\lambda_1$ change state to the excited state. The second external laser 206 turns on and illuminates the receiver chip modules 204 with light of wavelength $\lambda_2$. The second material 202 of the receiver chip modules 204 which are in the excited state (illuminated by the signal light 106 of a corresponding transmitter chip module 103) produce an output current or voltage at leads 208, 210 when they receive illumination at wavelength $\lambda_2$. Other receiver chip modules produce no output current or voltage.

Logic circuits 212 (see FIGS. 2a and 2b) on the receiver substrate 504 sense the outputs of the receiver chip modules 204 which are summed to provide a data signal. This completes the cycle which can be repeated any number of times to continually transmit data from the transmitter 100 to the receiver 200.

Figure 7:
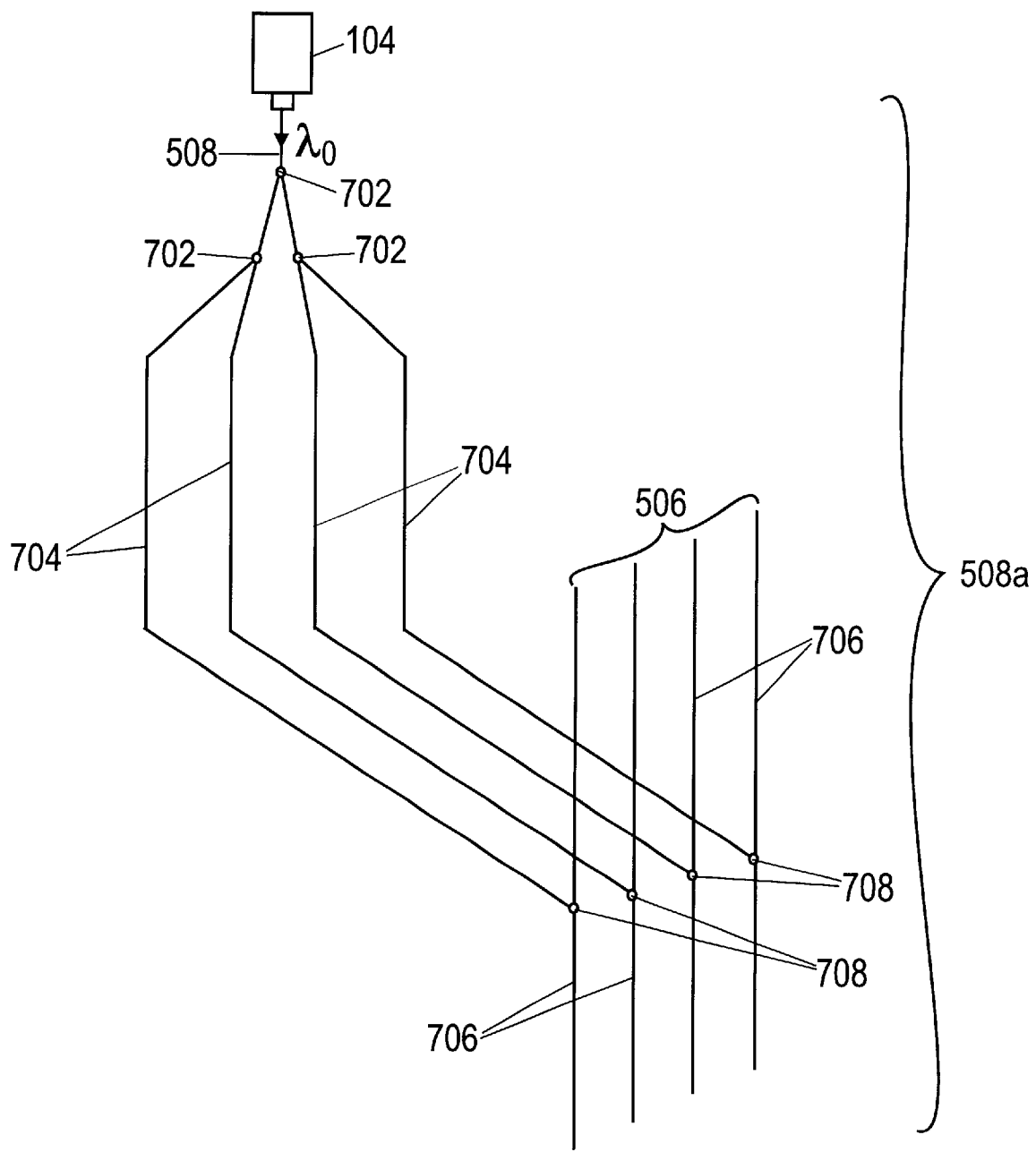
FIG. 7 illustrates a schematic of a junction of FIG. 6.

FIG. 7 shows the details of junction 508a. In general, the first external laser 104 preferably splits into $2^n$ output paths through N levels of fiber splitters 702. In this embodiment, N=2, so that one initial path (508) splits into 4 outputs after 2 levels of splitting. Each split divides the energy in the light approximately equally among the two outputs. In FIG. 7, the first external laser 104 illuminates fiber 508 with light at wavelength $\lambda_0$. The light passes through 1-to-2 fiber couplings 702 creating a total of 4 outputs 704, each carrying about one-fourth of the power input to fiber 508. The four outputs 704 reach four fibers 706 of the optical signal path 506 (alternatively referred to as a data bus), and are coupled onto the optical signal path 506 at coupling points 708. These are 2-to-1 couplings and are the inverse of couplings 702. They are directional in the sense that light flowing downward from the first external laser 104 couples onto the optical signal path 506 and continues to travel downward toward the transmitter chip modules 103. Virtually no light from the first external laser 104 flows upward on the optical signal path 506 towards the receiver chip modules 204. A similar junction arrangement is also used at the receiver site.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for transmitting data between first and second VLSI chips, the apparatus comprising:

a transmitter disposed on the first VLSI chip, the transmitter having a first material capable of radiating light of a first wavelength when both a zero voltage potential exists across the first material and when illuminated by light of a second wavelength, the transmitter further having voltage control means for controlling the voltage potential across the first material;

a receiver disposed on the second VLSI chip, the receiver having a second material capable of producing a signal in the form of a produced voltage potential or produced current flow when illuminated by light of both the first wavelength and a third wavelength, the receiver further having signal detecting means for detecting the presence of the produced signal;

at least one light source optically coupled to the transmitter and receiver for illuminating the first material with light of the second wavelength and for illuminating the second material with light of the third wavelength; and light transmission means for transmitting the light of the first wavelength from the transmitter to the receiver.

2. The apparatus according to claim 1, wherein a first and second light source are provided, the first light source being optically coupled to the first material of the transmitter and emitting light of the second wavelength, the second light source being optically coupled to the second material of the receiver and emitting light of the third wavelength.

3. The apparatus according to claim 2, wherein the first and second light sources are external lasers.

4. The apparatus according to claim 1, wherein the first material is a carbazole or a derivative thereof.

5. The apparatus according to claim 1, wherein the second material is a porphyrin or a derivative thereof.

6. The apparatus according to claim 1, wherein the light transmission means is an optical fiber.

7. The apparatus according to claim 2, wherein the light transmission means is an optical fiber and wherein the first and second light sources are optically coupled into the optical fiber such that the light emitted by each light source only illuminates their respective transmitter or receiver.

8. The apparatus according to claim 1, further comprising a processor for controlling and synchronizing the operation of the first and second light sources, the voltage control means, and the signal detecting means.

9. The apparatus according to claim 1, wherein the presence of the produced signal corresponds to a logical value of one, and the absence of the signal corresponds to a logical value of zero.

10. An apparatus for transmitting data between first and second VLSI chips, the apparatus comprising:

a plurality of transmitters disposed on the first VLSI chip, each transmitter having a first material capable of radiating light of a first wavelength when both a zero voltage potential exists across the first material and when illuminated by light of a second wavelength;

a plurality of receivers disposed on the second VLSI chip, each receiver corresponding to a transmitter on the first VLSI chip, each receiver having a second material capable of producing a signal in the form of a produced voltage potential or produced current flow when illuminated by light of both the first wavelength and a third wavelength;

voltage control means for individually controlling the voltage potential across the first material of each transmitter;

signal detecting means for individually detecting the presence of the produced signal from each receiver;

at least one light source optically coupled to each of the transmitters and receivers for illuminating the first material of each of the transmitters with light of the second wavelength and for illuminating the second material of each of the receivers with light of the third wavelength; and light transmission means for transmitting the light of the first wavelength from each of the transmitters to a corresponding receiver.

11. The apparatus according to claim 10, wherein a first and second light source are provided, the first light source being optically coupled to the first material of each of the transmitters and emitting light of the second wavelength, the second light source being optically coupled to the second material of each of the receivers and emitting light of the third wavelength.

12. The apparatus according to claim 11, wherein the first and second light sources are external lasers.

13. The apparatus according to claim 10, wherein the first material is a carbazole or a derivative thereof.

14. The apparatus according to claim 10, wherein the second material is a porphyrin or a derivative thereof.

15. The apparatus according to claim 10, wherein the light transmission means is a fused fiber bundle array wherein each fiber of the array optically connects a transmitter with a corresponding receiver.

16. The apparatus according to claim 11, wherein the light transmission means is a fused fiber bundle array and wherein the first and second light sources are optically coupled into the fused fiber bundle array such that the light emitted by each light source only illuminates their respective transmitter or receiver.

17. The apparatus according to claim 10, wherein eight transmitter and eight corresponding receivers are provided to transmit an eight bit data string from the first VLSI chip to the second VLSI chip.

18. The apparatus according to claim 10, further comprising a processor for controlling and synchronizing the operation of the first and second light sources, the voltage control means, and the signal detecting means.

19. The apparatus according to claim 10, wherein the presence of the produced signal corresponds to a logical value of one, and the absence of the signal corresponds to a logical value of zero.

20. A transmitter for transmitting data in the form of an optical signal, the transmitter comprising:

a transmitter chip module having a material capable of radiating light of a first wavelength when both a zero voltage potential exists across the material and when illuminated by light of a second wavelength;

a light source optically coupled to the transmitter chip module for illuminating the material with light of the second wavelength; and voltage control means for controlling the voltage potential across the first material.

21. The transmitter according to claim 20, wherein the light source is an external laser.

22. The transmitter according to claim 20, wherein the material is a carbazole or a derivative thereof.

23. The transmitter according to claim 20, further comprising a processor for controlling and synchronizing the operation of the light source and the voltage control means.

24. A receiver for receiving data in the form of an optical signal having a first wavelength, the receiver comprising:

a receiver chip module having a material capable of producing a signal in the form of a produced voltage potential or produced current flow when illuminated by light of both the first wavelength and light of a second wavelength;

a light source optically coupled to the receiver chip module for illuminating the material with light of the second wavelength; and signal detecting means for detecting the presence of the produced signal.

25. The receiver according to claim 24, wherein the light source is an external laser.

26. The receiver according to claim 24, wherein the material is a porphyrin or a derivative thereof.

27. The receiver according to claim 24, further comprising a processor for controlling and synchronizing the operation of the light source and the signal detecting means.

28. The receiver according to claim 24, wherein the presence of the produced signal corresponds to a logical value of one, and the absence of the signal corresponds to a logical value of zero.

* * * * *